United States Patent
Anselmann et al.

(10) Patent No.: US 6,648,958 B2
(45) Date of Patent: Nov. 18, 2003

(54) HIGHLY LIGHT-SCATTERING PIGMENT MIXTURE

(75) Inventors: Ralf Anselmann, Ramsen (DE); Martin Knapp, Dieburg (DE); Uta Hillgärtner, Darmstadt (DE)

(73) Assignee: Merck Patent Gesellschaft, Darmstadt (DE)

( * ) Notice: Subject to any disclaimer, the term of this patent is extended or adjusted under 35 U.S.C. 154(b) by 0 days.

(21) Appl. No.: 10/292,519

(22) Filed: Nov. 13, 2002

(65) Prior Publication Data

US 2003/0082123 A1 May 1, 2003

Related U.S. Application Data

(63) Continuation of application No. 09/786,970, filed as application No. PCT/EP99/06751 on Sep. 13, 1999, now abandoned.

(30) Foreign Application Priority Data

Sep. 14, 1998 (DE) .......................... 198 42 134

(51) Int. Cl.[7] .................................. C09C 1/28
(52) U.S. Cl. ................ 106/442; 106/436; 106/482
(58) Field of Search ................. 106/436, 442, 106/482

(56) References Cited

U.S. PATENT DOCUMENTS

| 3,087,828 A | 4/1963 | Linton |
| 3,087,829 A | 4/1963 | Linton |
| 3,553,001 A | 1/1971 | Kohlschutter et al. |
| 3,874,890 A | 4/1975 | Bernhard et al. |
| 4,089,932 A | 5/1978 | Morita et al. |
| 5,846,310 A | * 12/1998 | Noguchi et al. ............ 106/482 |

FOREIGN PATENT DOCUMENTS

| DE | 2155281 | 5/1973 |
| DE | 2610852 | 10/1976 |
| EP | 0162716 | 11/1985 |
| GB | 1141924 | 2/1969 |

OTHER PUBLICATIONS

JP 06–056628 (English Translation).
JP 10–087433 (English Translation).

* cited by examiner

*Primary Examiner*—C. Melissa Koslow
*Assistant Examiner*—Shalie Manlove
(74) *Attorney, Agent, or Firm*—Millen, White, Zelano & Branigan, P.C.

(57) ABSTRACT

Highly light-scattering pigment mixture featuring
(i) 70–99.9% by weight of a component A consisting of spherical silicon dioxide with a diameter of less than 50 μm, coated with titanium dioxide and optionally a further layer of $SiO_2$, and
(ii) 0.1–30% by weight of a component B consisting of spherical silicon dioxide with a diameter of less than 50 μm, coated with titanium dioxide as a first layer and iron(III) oxide as a second, outer layer, the refractive index of the pigment being adjusted to a value of between 1.45 and 1.65.

20 Claims, No Drawings

HIGHLY LIGHT-SCATTERING PIGMENT MIXTURE

This application is a continuation of Ser. No. 09/786,970 filed Mar. 13, 2001, now abandoned, which is a 371 of PCT/EP99/06751 filed Sep. 13, 1999.

The invention relates to a pigment mixture for cosmetic formulations in particular which on the one hand gives the human skin a natural appearance but on the other hand makes lines very substantially invisible.

Many female consumers are dissatisfied with the artificial appearance produced by commercial makeup products. Although these makeup products do act to hide the lines, the natural appearance of the skin is lost in the process.

Commercial makeup products often use pearl lustre pigments, whose lustre is reduced by coating or mixing them with barium sulfate or colloidal titanium dioxide.

JP 06-056 628 describes a cosmetic powder consisting of titanium dioxide-coated mica plus a top layer of silicon dioxide.

JP 10-087 433 describes a makeup product consisting of a pearl lustre pigment coated with a spherical material such as silicon dioxide, calcium silicate or an organic polymer. The stated particle size is from 10 to 50 nm.

The use of pearl lustre pigments has the drawback that a significant directed-reflection component deriving from the platelet-shaped structure intensifies the visual effect of lines.

It is an object of the invention to provide a pigment mixture whose refractive index is adapted to the refractive index of the human skin and its colour properties and which provides optimum scattering of the reflected and transmitted light.

This object has been achieved by a pigment mixture comprising (i) 70–99.9% by weight of a component A consisting of spherical silicon dioxide with a diameter of less than 50 μm, coated with titanium dioxide and optionally a further layer of $SiO_2$, and (ii) 0.1–30% by weight of a component B consisting of spherical silicon dioxide with a diameter of less than 50 μm, coated with titanium dioxide as a first layer and iron(III) oxide as a second, outer layer, the refractive index of the pigment being adjusted to a value of between 1.45 and 1.65.

This object is further achieved in accordance with the invention by a process for preparing the pigment mixture of the invention, in which, in a first stage of the process, spherical silicon dioxide with a diameter of less than 50 μm is coated with titanium dioxide and, in a second stage of the process, the resulting suspension of the component A is admixed, with stirring and at a pH of from 4 to 9, with the uncalcined powder form of component B, which has been prepared beforehand by coating spherical silicon dioxide having a diameter of less than 50 μm with titanium dioxide as a first layer and iron(III) oxide as a second, outer layer, until the desired hue angle has been reached, and the mixture is stirred for a further 10 to 30 minutes, and the pigment mixture obtained is separated from the reaction medium, washed, dried and calcined at from 500 to 900° C.

In a particular embodiment of the process, the component A, after coating with titanium dioxide, is additionally coated with silicon dioxide.

The invention additionally provides for the use of the pigment of the invention in formulations, especially in paints, varnishes, printing inks, for laser marking, for seed coating, in cosmetic formulations, such as makeup products, face powders, lipsticks, toothpastes, emulsion products, as a peeling additive, and creams and liquid foundations.

Spherical silicon dioxide is used as a starting product for the preparation of the pigment. Because of the process by which they are prepared, the spheres are not uniform in diameter but have a distribution spectrum as regards their particle size. Suitability as the starting product is possessed by fractions in which 99% of the particles are smaller than 50 μm. Preference is given to fractions in which 95% of the particles are smaller than 35 μm and particular preference to those fractions in which 90% of the particles are smaller than 20 μm.

The preparation of spherical silicon dioxide is known. It is carried out by hydrolysing organic or inorganic silicon compounds in an emulsion process. Processes of this kind are described, for example, in DE 21 55 281, DE 26 10 852, GB 1 141 924 and EP 0 162 716. Spherical silicon dioxide is commercially available. Under the designation Ronasphere®, Merck KGaA supplies spherical silicon dioxide with a particle size of less than 20 μm.

The coating of the spherical silicon dioxide with titanium dioxide, iron oxide and silicon dioxide is carried out by known processes.

Coating with titanium dioxide takes place in accordance with the process described in U.S. Pat. No. 3,553,001 and EP 0 803 550. This involves slowly adding an aqueous titanium salt solution to the suspension of the spherical silicon dioxide heated to 50–100° C., especially 70–80° C., and maintaining a substantially constant pH of about 0.5–5, especially about 1.5–2.5, by simultaneous metered addition of a base, such as aqueous ammonia solution or an aqueous alkali metal hydroxide solution, for example. As soon as the desired thickness of the precipitated $TiO_2$ layer has been reached, the addition of the titanium salt solution is stopped.

A feature of this process, which is also known as the titration process, is that it avoids an excess of titanium salt. This is achieved by supplying to the hydrolysis per unit time only that amount which is required for uniform coating with the hydrated $TiO_2$ and which can be accepted per unit time by the available surface area of the particles to be coated. Therefore, no hydrated titanium dioxide particles are formed that are not deposited on the surface to be coated. The amount of titanium salt added per minute in this process is within the order of magnitude of from about 0.01 to $2 \cdot 10^{-4}$ mol of titanium salt per square meter of surface area to be covered.

In the case of coating with iron(III) oxide it is possible to start both from iron(III) salts and from iron(II) salts, alone or as a mixture, as is described, for example, in U.S. Pat. No. 3,087,828 and U.S. Pat. No. 3,087,829. In U.S. Pat. No. 3,874,890, the initial coating of iron(II) hydroxide is oxidized to iron(III) oxide hydrate. It is preferred to start from iron(III) salts. To this end, a solution of iron(III) chloride is metered in to an aqueous suspension of the titanium dioxide-coated spherical silicon dioxide at a temperature of from 60 to 90° C. and at a pH of from 2.5 to 4.5. The pH is kept constant by simultaneous metered addition of 32% sodium hydroxide solution. This process is described in DE 196 18 568.

To apply the silicon dioxide, layer to the titanium dioxide-coated spherical silicon dioxide it is preferred to apply the process described in DE 196 18 569. A sodium silicate solution is metered in to a suspension of the material to be coated, this suspension being heated at about 50–100° C., especially 70–80° C. The pH is kept constant at from 4 to 10, preferably from 6.5 to 8.5, by simultaneous addition of 10% hydrochloric acid. After the silicate solution has been added, the mixture is stirred for 30 minutes.

The pigment mixture is prepared in a plurality of stages. To start with, in a first stage, the component B is prepared by coating the spherical silicon dioxide first with titanium dioxide and then with iron oxide. After coating, the product is separated from the reaction medium, washed and dried.

In a second stage, the component A is prepared by coating spherical silicon dioxide with titanium dioxide and, if desired, silicon dioxide. The coated material is left in the coating medium.

In a third stage, the component B in powder form, which has only been dried and not calcined, is metered with stirring into the component A, which has remained in the coating medium, until the desired hue angle has been reached. The hue angle of the wet mixture in this procedure is adjusted to 70°–85°, preferably 76°–78°. Thereafter, the mixture is separated off, washed, dried and calcined from 500 to 900° C. The hue angle of the resultant pigment lies within the range from 65° to 80°, preferably 70°–74° C. The L value of the pigment is 80°–90°, preferably 87°–88°. Since the two components are mixed according to hue angle, the mixing ratio varies from batch to batch.

A preferred pigment mixture contains 85–99% by weight of component A and 1–15% by weight of component B, especially 90–95% of component A and 5–10% by weight of component B.

In order to be able to achieve the desired hue angle of the pigment, the L value of the component A must be more than 80.

The pigment mixture of the invention preferably has the following composition:
$SiO_2$ from 80.5 to 84.5% by weight
$TiO_2$ from 14.4 to 18.5% by weight
$Fe_2O_3$ from 0.1 to 1% by weight.

The refractive index of the pigment mixture is adjusted to from 1.45 to 1.65. This is done by coating with titanium dioxide as described in DE 42 19 287.

The pigment mixture of the invention may be incorporated in a concentration of from 1 to 20% by weight, preferably from 8 to 12% by weight, into all cosmetological decorative and care products, especially into cosmetic formulations, examples being makeup, concealers, face powders, lipsticks, emulsion products, and liquid foundations. The concentration of the pigment mixture in loose powders is even from 0.1 to 80% by weight.

When processing the pigment mixture of the invention, it is generally unnecessary to employ any particular method of incorporation. The mixture features very good dispersibility, pH stability and heat stability, and may be readily processed using all conceivable cosmetic materials. The pigment mixture can be dispersed in oil phases and water phases, and lends itself exceptionally well to dispersion in powder mixtures. Because of its neutral masstone and its high transparency, it contributes to reducing skin shine after application, and to providing visual smoothing of lines.

The pigment mixture of the invention may be used to pigment varnishes, powder coatings, paints, printing inks, polymers, agricultural films, seed coatings, and in cosmetic formulations, such as lipsticks, nail varnishes, cosmetic sticks, powder compresses, makeup products, shampoos, loose powders, and gels.

The concentration of the pigment mixture in the application system to be pigmented is generally between 0.1 and 70% by weight, preferably between 0.1 and 50% by weight, and in particular between 1.0 and 20% by weight, based on the overall solids content of the system. Generally, the concentration is dependent on the specific case in hand.

Polymers contain the pigment mixture of the invention in amounts of from 0.01 to 50% by weight, preferably from 0.01 to 25% by weight, in particular from 0.1 to 7% by weight, based on the polymer mass.

In the coatings field, the pigment mixture is used in amounts of from 0.1 to 30% by weight, preferably from 1 to 10% by weight, based on the coating dispersion.

In the context of the pigmentation of binder systems, for paints and printing inks for gravure, offset or screen printing, for example, or as precursors for printing inks, in the form of highly pigmented pastes, granules, pellets, etc., for example, pigment mixtures comprising spherical colorants, such as $TiO_2$, carbon black, chromium oxide, iron oxide, and also organic colour pigments, in particular, have proven to be particularly suitable. The pigment mixture is generally incorporated into the printing ink in amounts of 2–35% by weight, preferably 5–25% by weight, and in particular 8–20% by weight. Offset printing inks may contain up to 40% by weight or more of the pigment mixture. The precursors for printing inks, e.g. in granule form, as pellets, briquettes, etc., comprise the binder and additives and also up to 95% by weight of the pigment mixture of the invention. Printing inks comprising the pigment mixture of the invention exhibit cleaner hues and, owing to the good viscosity values, are of improved printability.

Accordingly, the invention further provides formulations comprising the pigment mixture of the invention.

The examples which follow are intended to illustrate the invention in more detail without restricting it.

EXAMPLES

Example 1

122.7 g of spherical silicon dioxide (Ronasphere®, manufacturer Merck KGaA) are suspended in 2277 g of fully deionized water and the suspension is heated to 75° C. with stirring. Then 88.5 g of titanium tetrachloride solution ($TiCl_4$ content: 64.4% by weight) are diluted with 90 g of fully deionized water and metered into the suspension over a period of 60 minutes at a metering rate of 1 ml/min and then at a rate of 2 ml/min. The pH is kept constant at from 2.2 to 2.3 by adding 32% sodium hydroxide solution. After the titanium tetrachloride solution has been metered in, the pH is adjusted to 3.2. Subsequently, 50.4 g of iron(III) chloride solution diluted with 50.4 g of water are added to the suspension at a rate of 0.6 ml/min, the pH being kept constant at from 3.2 to 3.3 by adding 32% sodium hydroxide solution. The mixture is subsequently stirred for 15 minutes and the pH is adjusted to 7.0. The suspension is allowed to cool and, settle overnight. The supernatant solution is decanted off and discarded. The sediment is isolated on a suction filter, washed salt-free with 5 l of fully deionized water, dried overnight at 110° C. in a drying oven, and passed through a 0.3 mm sieve. This gives 154 g of component B.

9.2 kg of spherical silicon dioxide (Ronasphere®, manufacturer Merck KGaA) are suspended in 170 l of fully deionized water and the suspension is heated to 75° C. with stirring. Then 10.43 l of titanium tetrachloride solution are diluted with 3 l of fully deionized water and metered into the suspension over a period of 60 minutes at a rate of 0.075 l/min and then at a rate of 0.150 l/min. The pH is kept constant at from 2.2 to 2.3 by adding 32% sodium hydroxide solution. After the titanium tetrachloride solution has been metered in, stirring is continued for 15 minutes and the pH is adjusted to 7.0. The resulting component A is left in the reactor.

Subsequently, 715 g of the dried and sieved component B are added to the suspension of component A in the reactor. The mixture is stirred for 15 minutes and left to cool and settle overnight. After the supernatant solution has been decanted, the sediment is filtered off on a single-layer filter and washed salt-free with 1000 l of fully deionized water. The resulting pigment is dried overnight at 110° C. and calcined at 650° C. in a rotary tube furnace with a residence time of 15 minutes. This gives a wool-white powder which feels very good on the skin.

Example 2

Day Cream

| Phase | Composition | Trade name | Manufacturer | % |
|---|---|---|---|---|
| A | Silica, CI 77891 (Titanium Dioxide), CI 77491 (Iron Oxides) | Ronasphere ® LDP | (1) | 10.00 |
|  | Magnesium Aluminium Silicate | Veegum HV | (5) | 1.00 |
|  | Methyldibromo-glutaronitrile, Phenoxyethanol | Euxyl K 400 | (2) | 0.10 |
|  | Sorbitol | Karion F liquid | (1) | 3.00 |
|  | Aqua (Water) | Water, demineralized | (1) | 48.44 |
| B | Methylparaben | Methyl 4-hydroxybenzoate | (1) | 0.18 |
|  | Propylparaben | Propyl 4-hydroxybenzoate | (1) | 0.08 |
|  | Propylene Glycol | 1,2-Propanediol | (1) | 3.00 |
| C | Glyceryl Stearate, PEG-100 Stearate | Arlacel 165 | (4) | 5.00 |
|  | Cetearyl Alcohol | Lanette O | (6) | 1.50 |
|  | Caprylic Capric Triglyceride | Miglyol 812 | (1) | 7.00 |
|  | Butyrospermum Parkii (Shea Butter) | Shea butter | (8) | 2.00 |
|  | Cetearyl Isononanoate | Cetiol SN | (6) | 7.00 |
|  | Octyldodecanol | Eutanol G | (6) | 7.50 |
|  | Cetearyl Glucoside, Cetearyl Alcohol | Emulgade PL 68/50 | (6) | 2.00 |
| D | Perfume | Perfume oil 200530 | (3) | 0.20 |
|  | Cyclomethicone | Dow Corning 345 | (7) | 2.00 |
|  | Citric Acid | Citric acid | (1) | q.s. |

Preparation:

Mix phase B and heat until the solution is clear. Disperse the Veegum in the water of phase A, add remaining raw materials, heat to 80° C., and add phase B. Mix phase C and heat to 80° C. Then add phase C to phase A/B and homogenize. Cool to 40° C. with stirring and add phase D. The pH is adjusted to 6 using 10% citric acid.

| Sources: |
|---|
| (1) Merck KGaA |
| (2) Schülke & Mayr |
| (3) Fragrance Resources |
| (4) ICI |
| (5) Monsanto |
| (6) Henkel KGaA |
| (7) Dow Corning |
| (8) E. H. Wagner |

Example 3

Eye Cream

| Phase | Composition | Trade name | Manufacturer | % |
|---|---|---|---|---|
| A | Silica, CI 77891 (Titanium Dioxide), CI 77491 (Iron Oxides) | Ronasphere ® LDP | (1) | 10.00 |
|  | Stearyl Alcohol, Steareth-7, Steareth-10 | Emulgator E 2155 | (2) | 5.50 |
|  | Prunus Amygdalus Dulcis (Sweet Almond Oil) | Sweet almond oil | (3) | 2.40 |
|  | Octyl Palmitate | Ceraphyl 368 | (4) | 5.80 |
|  | Hydrogenated Microcrystalline Wax, Polycyclopentadiene | Lunacera MWN | (5) | 2.40 |
|  | Isopropyl Stearate | Isopropyl stearate | (1) | 2.40 |
|  | Tocopheryl Acetate | DL-α-Tocopherol acetate | (1) | 0.10 |
|  | Retinyl Palmitate | Vitamin A palmitate | (1) | 0.05 |
|  | Propylparaben | Propyl 4-hydroxybenzoate | (1) | 0.05 |
| B | Glycerine | Glycerine | (1) | 3.80 |
|  | Methylparaben | Methyl 4-hydroxybenzoate | (1) | 0.15 |
|  | Aqua (Water) | Water, demineralized |  | 66.95 |

Preparation:

Heat phases A and B to 75° C. and stir until all constituents have completely dissolved. Add phase B to phase A with stirring. Then homogenize. Cool to room temperature with stirring.

| Sources: |
|---|
| (1) Merck KGaA |
| (2) Th. Goldschmidt AG |
| (3) Henkel KGaA |
| (4) H. B. Fuller GmbH |

Example 4

Cream to Powder

| Phase | Composition | Trade name | Manufacturer | % |
|---|---|---|---|---|
| A | Silica, CI 77891 (Titanium Dioxide), CI 77491 (Iron Oxides) | Ronasphere ® LDP | (1) | 10.00 |
|  | Mica, CI 17891 (Titanium Dioxide) | Extender W | (1) | 12.00 |
|  | Mica, CI 77492 (Iron Oxides) | Microna Matte Yellow | (1) | 4.80 |
|  | CI 77491 (Iron Oxides), Mica | Microna ® Matte Red | (1) | 0.80 |
|  | CI 77499 (Iron Oxides) | Microna ® Matte Black | (1) | 0.60 |
|  | Mica, CI 77491 (Iron Oxides) | Microna ® Matte Orange | (1) | 0.40 |
|  | Talc | Talc | (1) | 6.40 |
|  | Lauroyl Lysine | Amihope LL | (2) | 1.50 |
|  | Aluminium Starch | Dry Flow PC | (3) | 14.40 |

-continued

| Phase | Composition | Trade name | Manufacturer | % |
|---|---|---|---|---|
| | Octenylsuccinate | | | |
| B | Octyl Palmitate | Ceraphyl 368 | (4) | 29.00 |
| | Mineral Oil, Lanolin Alcohol | Amerchol L-101 | (5) | 2.50 |
| | Copernicia Cerifera (Carnauba Wax) | Carnauba wax | (6) | 1.30 |
| | Ceresin | Lunacera W 80 | (7) | 2.00 |
| | Hydrogenated Castor Oil | Cutina HR | (8) | 3.50 |
| | Phenyl Trimethicone | Dow Corning 556 | (9) | 9.50 |
| | Sorbitan Sesquioleate | Arlacel 83 | (10) | 0.50 |
| | Tocopheryl Acetate | DL-α-tocopherol acetate | (1) | 0.50 |
| | Polyparaben | Propyl 4-hydroxybenzoate | (1) | 0.20 |
| | PEG-8, Tocopherol, Ascorbyl Palmitate, Ascorbic Acid, Citric Acid | Oxynex K liquid | (1) | 0.10 |

Preparation:
Mix all of the constituents of phase B together at 85° C. Gradually, the constituents of phase A are stirred in. Cool the homogeneous melt to about 80° C. with stirring and pour it into dishes.

Sources:
(1) Merck KGaA
(2) Lehmann & Voss & Co.
(3) National Starch and Chemical Limited
(4) Van Dyk
(5) Amerchol
(6) Kahl
(7) H. B. Fuller GmbH
(8) Henkel KGaA
(9) Dow Corning
(10) ICI Example 5
Lipcare Stick

| Phase | Composition | Trade name | Manufacturer | % |
|---|---|---|---|---|
| A | Silica, CI 77891 (Titanium Dioxide), CI 77491 (Iron Oxides) | Ronasphere ® LDP | (1) | 10.00 |
| B | Caprylic/Capric Triglyceride | Miglyol 812 Neutral oil | (2) | 12.00 |
| | Cera-Alba (Beeswax) | Bees wax | (1) | 11.00 |
| | Pantothenyl Ethyl Ether | Pantothenyl Ethyl Ether | (3) | 1.00 |
| | Ceresin, Copernicio Cerifera (Carnauba Wax) | Lunacera C 44 | (4) | 7.00 |
| | Lanolin | Adeps Lanae SP | (5) | 3.50 |
| | Isopropyl Myristate | Isopropyl myristate | (1) | 4.00 |
| | Paraffinum Liquidum (Mineral Oil) | Viscous liquid paraffin | (1) | 2.10 |
| | PEG-8, Tocopherol, Ascorbyl Palmitate, Ascorbic Acid, Citric Acid | Oxynex K liquid | (1) | 0.03 |
| | Propylparaben | Propyl 4-hydroxybenzoate | (1) | 0.07 |
| | Ricinus Communis (Castor Oil) | Castor oil | (5) | 49.30 |

Preparation:
The constituents of phase B are heated to 75° C. and melted. Ronasphere® LDP is added and all the ingredients are mixed thoroughly with stirring. The lipstick mass is then poured into the casting apparatus, preheated to 65° C., for 15 minutes. The homogeneous melt is poured into the casting moulds, preheated at 55° C. The moulds are subsequently cooled and the castings are removed when cold. After the lipsticks have been warmed to room temperature, they are briefly flamed.

Sources:
(1) Merck KGaA
(2) Hüls AG
(3) Fuji Chemical Industries
(4) H. B. Fuller
(5) Henry Lamotte Example 6
Hand Cream

| Phase | Composition | Trade name | Manufacturer | % |
|---|---|---|---|---|
| A | Silica, CI 77891 (Titanium Dioxide), CI 77491 (Iron Oxides) | Ronasphere ® LDP | (1) | 10.00 |
| | Sorbitan Isostearate, PEG-2 Hydrogenated Castor Oil, Ozokerite, Hydrogenated Castor Oil | Arlacel 582 | (2) | 3.20 |
| | PEG-40 Sorbitan Peroleate | Arlatone T | (2) | 0.80 |
| | Paraffinum Liquidum (Mineral Oil) | Highly mobile liquid paraffin | (1) | 12.00 |
| | Isopropyl Myristate | Isopropyl myristate | (1) | 4.00 |
| | Bisabolol | (−)-α-Bisabolol | (1) | 0.30 |
| | Propylparaben | Propyl 4-hydroxybenzoate | (1) | 0.10 |
| B | Glycerine | Glycerine | (1) | 3.00 |
| | Magnesium Sulfate | Magnesium sulfate heptahydrate | (1) | 0.50 |
| | Methylparaben | Methyl 4-hydroxybenzoate | (1) | 0.20 |
| | Allantoin | Allantoin | (1) | 0.10 |
| | Aqua (Water) | Water, demineralized | | 65.80 |

Preparation:
Heat phases A and B to 75° C. and stir until all constituents have completely dissolved. Add phase B to phase A with stirring. Then homogenize. Cool to room temperature with stirring.

| Sources: |
|---|
| (1) Merck KGaA |
| (2) ICI |

What is claimed is:

1. A highly light-scattering pigment mixture, comprising
    (i) 70–99.9% by weight of a component A consisting of spherical silicon dioxide with a diameter of less than 50 μm, coated with titanium dioxide and optionally coated with a further layer of silicon dioxide, and
    (ii) 0.1–30% by weight of a component B consisting of spherical silicon dioxide with a diameter of less than 50 μm, coated with titanium dioxide as a first layer and iron(III) oxide as a second outer layer, the refractive index of the pigment mixture being adjusted to a value of between 1.45 and 1.65.

2. A pigment mixture according to claim 1, comprising
    $SiO_2$ from 80.5 to 84.5% by weight,
    $TiO_2$ from 14.4 to 18.5% by weight, and
    $Fe_2O_3$ from 0.1 to 1% by weight.

3. A process for preparing a pigment mixture, said pigment mixture being according to claim 1, comprising coating spherical silicon dioxide that has a diameter of less than 50 μm with titanium dioxide, and admixing the resultant component A with stirring, at a pH of from 4 to 9, with an uncalcined powder form of component B, which has been prepared by coating spherical silicon dioxide having a diameter of less than 50 μm with titanium dioxide as a first layer and iron(III) oxide as a second outer layer, until a hue angle of 70 to 85° has been reached, and further stirring the resultant mixture for 10 to 30 minutes, and isolating, washing, drying and calcining at 500 to 900° C. the resultant pigment mixture.

4. A process according to claim 3, wherein component A, after coating with titanium dioxide, is additionally coated with silicon dioxide.

5. A composition comprising a pigment mixture according to claim 1.

6. A makeup, a powder, a lipstick, a cosmetic stick, a nail varnish, a cream, a shampoo or gel comprising a pigment mixture according to claim 1.

7. A paint, varnish, powder coating, printing ink, polymer, agricultural film or seed coating comprising a pigment mixture according to claim 1.

8. A pigment mixture according to claim 1, that has a hue angle of 65 to 80°.

9. A pigment mixture according to claim 1, that has a hue angle of 70 to 74°.

10. A pigment mixture according to claim 1, wherein 95% of the spherical silicon dioxide has a diameter of less than 35 μm.

11. A pigment mixture according to claim 1, wherein 90% of the spherical silicon dioxide has a diameter of less than 20 μm.

12. A process for preparing a pigment mixture, said pigment mixture being according to claim 2, comprising coating spherical silicon dioxide that has a diameter of less than 50 μm with titanium dioxide, and admixing the resultant component A with stirring, at a pH of from 4 to 9, with an uncalcined powder form of component B, which has been prepared by coating spherical silicon dioxide having a diameter of less than 50 μm with titanium dioxide as a first layer and iron(III) oxide as a second outer layer, until a hue angle of 70 to 85° has been reached, and further stirring the resultant mixture for 10 to 30 minutes, and isolating, washing, drying and calcining at 500 to 900° C. the resultant pigment mixture.

13. A process according to claim 2, wherein component A, after coating with titanium dioxide, is additionally coated with silicon dioxide.

14. A composition comprising a pigment mixture according to claim 2.

15. A makeup, a powder, a lipstick, a cosmetic stick, a nail varnish, a cream, a shampoo or a gel comprising a pigment mixture according to claim 2.

16. A paint, varnish, powder coating, printing ink, polymer, agricultural film or seed coating comprising a pigment mixture according to claim 2.

17. A pigment mixture according to claim 2, that has a hue angle of 65 to 80°.

18. A pigment mixture according to claim 2, has a hue angle of 70 to 74°.

19. A pigment mixture according to claim 2, of the spherical silicon dioxide has a diameter of less than 35 μm.

20. A pigment mixture according to claim 2, wherein 90% of the spherical silicon dioxide has a diameter of less than 20 μm.

* * * * *

UNITED STATES PATENT AND TRADEMARK OFFICE
CERTIFICATE OF CORRECTION

PATENT NO. : 6,648,958 B2 Page 1 of 1
DATED : November 18, 2003
INVENTOR(S) : Ralf Anselmann et al.

It is certified that error appears in the above-identified patent and that said Letters Patent is hereby corrected as shown below:

<u>Column 10,</u>
Line 37, "claim 2, that" should read -- claim 2 that --.
Line 39, "claim 2, has" should read -- claim 2 that has --.
Line 41, "claim 2, of" should read -- claim 2, wherein 95% of --.

Signed and Sealed this

Thirty-first Day of May, 2005

JON W. DUDAS
*Director of the United States Patent and Trademark Office*